United States Patent [19]
Whitenack et al.

[11] Patent Number: 4,920,251
[45] Date of Patent: Apr. 24, 1990

[54] COMPACT, EFFICIENT, EASY-TO-CLEAN FOOD STEAMER FOR HOME USE, WITH SAFETY FEATURES AND VERSATILE MODULAR FOOD COMPARTMENT

[75] Inventors: Joan E. Whitenack, Arcadia; George Sanchez, Northridge; Earlyn W. Stone, Nuevo; Buddy A. Colton, El Monte, all of Calif.

[73] Assignee: Acry Industries, Incorporated, Azusa, Calif.

[21] Appl. No.: 317,013

[22] Filed: Feb. 28, 1989

[51] Int. Cl.$^5$ .............................................. A47J 27/05
[52] U.S. Cl. ..................................... 219/401; 219/275
[58] Field of Search ............... 219/401, 271, 272, 273, 219/274, 275, 276; 126/369, 369.1, 369.2, 369.3, 20, 20.1, 20.2

[56] References Cited

U.S. PATENT DOCUMENTS

| | | | |
|---|---|---|---|
| 164,063 | 6/1875 | Welch | 126/369 |
| 1,344,326 | 6/1920 | Williams | 219/271 |
| 3,470,719 | 10/1969 | Frank | 219/271 |
| 4,509,412 | 4/1985 | Whittenburg | 126/369 |
| 4,650,968 | 3/1987 | Williams | 126/369.2 |

FOREIGN PATENT DOCUMENTS

239038 1/1960 Australia .............................. 126/369

Primary Examiner—Teresa J. Walberg
Attorney, Agent, or Firm—Peter I. Lippman

[57] ABSTRACT

Two square self-enclosing interchangeable food baskets can be used singly, or stacked shelf-style, or stacked with the upper basket inverted to form a single tall domed compartment. To generally confine the steam, a separate cover fits closely with the upper basket in either orientation, or with the single basket if only one is in use; the lower basket fits closely with a water tray, and the two baskets fit closely with each other. Each basket is a unitary plastic component, eliminating the severe cleaning problems, hot-surface and possible health hazards, and high cost of aluminum trays used in earlier self-enclosing baskets. The water tray too is plastic, eliminating the similar cleaning problems, hazards, and high cost of cast-aluminum water trays in an earlier extendable self-enclosing system. A die-cast heater is mounted in a central orifice of the water tray, and surrounded by a central well formed in the tray. A separate base houses an indicator light, and electrical connections for the heater and light. The water tray has a peripheral lip that fits over the outside edge of the base to deter water from reaching the electrical connections and components.

11 Claims, 5 Drawing Sheets

COMPACT, EFFICIENT, EASY-TO-CLEAN FOOD STEAMER FOR HOME USE, WITH SAFETY FEATURES AND VERSATILE MODULAR FOOD COMPARTMENT

BACKGROUND

1. Field of the Invention

This invention relates generally to devices for steam-cooking food in the home; and more particularly to a third-generation, countertop type, electrically powered apparatus that is very space-, energy- and time-efficient, self-enclosing, readily cleaned, safer than earlier units, and versatile in handling varying quantities and shapes of food.

2. Prior Art (a) First Generation Steamers—Food steaming is of course well known, and until recently was performed by placing food on racks inside generally conventional stovetop cooking vessels. Such vessels generally took the form of large saucepans or the like, with loosely fitted gravity-closed covers; however, pressurized vessels were also used.

All such equipment may be regarded as the first generation of food steaming devices for home use. It had many disadvantages.

First, it occupied a burner on the stove which otherwise might have been used for some other dish. Secondly, it required heating substantially the entire cooking vessel to the temperature of boiling water, before steaming could begin. This was wasteful in terms of time, since the user had to wait for the whole vessel to come to temperature in addition to waiting for the food to cook thereafter; and also in terms of energy, since the entire heat capacity of the cooking vessel had to be filled with heat in order to vaporize a small amount of water.

In addition, large vessels amenable to heating on a stove burner to vaporize water were, at least will until quite recently, necessarily of metal—or other opaque or at best translucent materials. Such construction impaired the user's ability to monitor visually the progress of the cooking.

Moreover, when more than one level of food rack was employed, the user had to contend with maneuvering of the hot racks out of the vessels, and manipulation of the food out of the hot lower racks. Of course millions of people mastered the tricks eventually, but they all remember well the burned fingers that led to this mastery.

At one time, pressure vessels were in great vogue for cooking. The pressure cooker is a special case of the stovetop steamers discussed above, and has all the drawbacks already mentioned—but in exaggerated form, because of the massive walls and cover-attachment mechanisms required to resist high internal pressure.

At least for light foods of diffuse structure such as leafy vegetables, or food such as carrots whose shape provides a high ratio of surface area to cookable volume, the time and energy required to heat the thick walls of a pressure cooker make that device inefficient. For such foods a pressure cooker thus uses even more heat, and is even more difficult, hazardous and slow, than the other stovetop steamers whose drawbacks have been discussed above.

All those drawbacks inspired the development of electrically powered countertop steamers. Such units may be regarded as a second generation of food-steaming apparatus for home use.

(b) Second-Generation Steamers—One such early steamer has enjoyed great popularity and commercial success because of its space-efficient and extendable self-enclosing configuration. In that device, a square cast-aluminum water tray is embedded in a plastic base.

A circular channel is formed in the underside of the tray to receive a sealed electrical heating rod, and the edges of the channel are crimped against the rod at several points to hold the heating rod firmly to the tray. A sheet-metal reflector is fastened under the heating rod to reflect heat away from the plastic base, and a separate thermostat unit is secured below the reflector.

Although very successful, that system has certain disadvantages. A significant fraction of power consumed by the heater is radiated to the plastic base directly or by reradiation from the reflector, never reaching the water tray. Heat conduction to the tray is inefficient except at points where the heater is forced hard against the tray.

Before cooking can begin, the heat capacity of the entire tray must be filled with heat until much of the tray is at the boiling point of water; hence yet more heat is wasted to the plastic base by downward radiation from the tray. Furthermore, due to good conduction within the metal of the water tray, the edges of the tray are very hot—causing warping of the plastic base along some edges of embedment, and also posing some hazard to users and others from exposed hot surfaces.

The reason for embedment of the water tray in the base was apparently to avoid even greater hot-surface hazard. The embedded configuration, however, leaves the unit susceptible to water leakage into the base around the edge of the tray, and consequent possible electrical hazard. This possibility is aggravated by the previously mentioned warping of the base along some edges of the tray, opening what should be relatively tight seams between the two components.

In that same earlier cooker, a perforated square aluminum screen rests on a peripheral ledge of the water tray, passing water vapor upward and returning condensate to the tray. A user of the device places food upon the aluminum screen, above the water in the tray—and also provides a confined space for contact of the food with steam.

The user has four choices for provision of this confined space. First, the user can place a cover directly upon the edge of the screen, supported by the tray ledge. The cover is a unitary plastic article, square in plan, with nearly vertical sides roughly two inches tall.

Secondly, when the user wishes to cook a larger quantity of food than can be fitted between the cover and the screen, the user can interpose between the screen and the cover an integral plastic extender, also about two inches tall. The extender has neither floor nor ceiling, serving only to elevate the cover above the screen to accommodate the larger quantity of food—and in particular tall pieces of food.

Thirdly, if the larger quantity of food which the user wishes to cook is in the form of small or shallow pieces, the user may not wish to place the entire quantity in a single mound on the tray. In some cases the weight may be too much for the tray, and in some cases steam may not penetrate easily to the center of the mound.

To avoid both these problems the user may position a second screen just above the extender and below the cover, to act as an elevated shelf. That arrangement distributes the weight of the food between two screens, and also permits division of the food into two separate groupings for better access of the steam.

Fourth, for further versatility the user can acquire additional metal screens and plastic extenders, and add shelf-wise and dome-wise to the two-layer structures described in the previous paragraphs. For example, a three-extender lower chamber could be topped with a one-extender-plus-cover upper chamber; or with two extenders and two more screens used in the shelf mode.

Whether the cover is supported by the screen on the water-tray ledge, or by an extender, or by a second or further screen on the extender, steam produced by heating of water in the water tray—and rising through the screen or screens —is generally confined by the cover. As will be understood throughout this document, the confinement provided by such plastic pieces resting on the water tray or on other plastic pieces, or on screens, is not strictly airtight and certainly not a high-pressure seal, but similar to the previously mentioned gravity-closed saucepan covers in retaining the greater portion of the steam within the enclosure for contact with the food.

When present, the extender participates in providing this confinement. In any of these variant configurations, food positioned between the bottom screen and the cover is confined in contact with the steam and thereby cooked. The plastic cover and extender advantageously (but optionally) can both be made transparent for better visual monitoring of the cooking process.

Water condenses on the walls and underside of the cover, and on the surfaces of the food, and together with juices from the food runs down through and around the screen or screens into the water tray for reuse. Some of the combined water and food juices in contact with the screen surfaces reevaporates from those surfaces.

Evaporation of combined water and juices from the aluminum water tray, and reevaporation of such mixtures from the hot aluminum screen surfaces, form gummy and chemically adherent mixed deposits of minerals and food residues on the metal. These deposits sometimes also attack the metal.

The tray and screen surfaces thereby become very unsightly and sometimes weakened. The water tray is essentially nonrepairable and acounts for the major part of the cost of the entire apparatus.

In addition to other drawbacks mentioned above, the screens have no handles. Removing or otherwise handling them for cleaning is therefore awkward at best—especially when the screens are hot. Removal of the lower screen in particular is most readily accomplished by inverting the water tray, but this requires dealing with water that remains in the tray. The screen, however, obscures the user's view of water in the tray.

If the screens did have handles, additional problems would arise in cleaning of the handles or their attachments, or in the hazard of the hot handle surfaces. The screens, as well as the water tray, are relatively expensive parts of the apparatus simply because they are of aluminum.

Furthermore, the hot aluminum screens, with their sometimes disrupted or degraded surfaces, are in direct contact with the food. Very recent research reports have demonstrated a possible health hazard from use of aluminum in cooking. More specifically, what has been preliminarily shown is a correlation between at least one human disease, namely Alzheimer's disease, and abnormal concentrations of aluminum in the brain. The significance or causality of this correlation is not known, and certainly no part of the purpose of this document is to raise undue alarms in this regard; however, one may conclude that—at least when all other things are equal—aluminum may be best avoided in construction of cooking equipment.

Another commercially available product in the second generation of home cooking equipment will now be mentioned, although in many ways it is less advanced that the unit already discussed. This steamer has baskets that are round in plan, and made of plastic and metal in combination. This device is very inefficient in terms of countertop space usage and overall food capacity: a square has over twenty-five percent more area than the corresponding inscribed circle.

Moreover the combined-material baskets retain many or most of the same metal-cleaning problems, hot surfaces, and possible health hazards of the unit discussed earlier. Some cleaning problems are exacerbated by the seams and crevices where plastic and metal are joined; in fact, basic sanitation can be impaired by such structures as they age.

Worst of all, the steamer under discussion lacks provision for modular extension of the cooking volume. A single-volume cooker suffers badly from lack of versatility: if the volume is big enough for, say, four ample portions of food, then the amount of energy and time required to cook two such portions is needlessly long. On the other hand, if the volume is appropriate for two portions, then four people cannot be served.

The baskets of this particular second-generation unit, nevertheless, only hold food and do not confine the steam. A separate external domed enclosure—also round and rather massive—is required for that purpose.

Accordingly the apparatus is much more cumbersome in use, and when the cover is removed it consumes counter space or other kitchen space. Even if placed on its side it occupies a large amount of countertop space; and being circular it is likely to roll away, unless the user positions it thoughtfully with an eye to this possibility. Generally speaking the cover is just one more piece of equipment to handle, clean, juggle in use of the apparatus, store, protect against marring or other damage—and, of course, purchase.

The separate external cover imposes an artificial limit on the number of baskets that can be stacked together, and at the same time it imposes an artificial constancy on the volume of the enclosure. Hence, in the device now under discussion the fundamental objective of modularity in basket construction in the first unit discussed earlier—namely, accommodation of the amount of time and energy consumed to the amount of food cooked —is lost.

The device now under discussion has yet another group of drawbacks. Water condensed on the food basket, or on the food itself, runs down to a collection well around the outside of the water tray—rather than back to the tray for reuse. Hence the device recycles neither the water nor the heat required to elevate the water from tap-water temperature to just below the boiling point.

Accordingly the unit runs out of water more rapidly, requiring greater attention during use to refill the water tray before it runs dry; and also consumes more energy in heating the refill water. This device does, however, eliminate the problems associated with a large cast-metal water tray by employing instead a small-diameter die-cast crucible heater centrally mounted in a plastic water tray.

The crucible heater has some operating advantages in terms of the amount of water required to produce steam, and the fraction of heater power that goes into the water when the water level is very low. Unfortunately, however, the crucible heater is relatively expensive in comparison with other small cast heater types.

In the apparatus under discussion, a horizontal web portion of the water tray forms a long path for heat conduction from the heater to the peripheral portions of the device which a user is likely to touch—thus effectively isolating the heater thermally from the user-accessible portions. In such a configuration the water tray need not be guarded by a separate plastic rim, and the tray is extended into a lip which surmounts the edge of the electrical-enclosure base. This lip, however, is continuous with the peripheral collection-well structure mentioned above, preventing recycling of condensate and producing the concomitant disadvantages already described.

In yet a third commercial unit of the second generation of home steamers, the water-tray features are similar to those just described, but the baskets used are all plastic. The latter feature provides substantial improvement in amenability to cleaning.

Although the baskets of this third commercial unit can be stacked shelf-wise, this stackability does not provide any modular increase in cooking capacity. In this device too, the baskets only hold food and do not confine the steam.

Here the confinement is provided by a relatively tall upstanding oval wall that is unitary with the base, and an oval cover. In other words, in configuration this unit is like a covered pot. In effect this second-generation cooker actually emulates a first-generation stovetop covered saucepan or pot!

Food-containing baskets are positioned inside the external pot structure. Accordingly the apparatus is cumbersome and unpleasant to use, since a person must peer into, and reach down into, the pot to observe the progress of cooking, and to place or remove the baskets.

As in the second device already discussed, the external structure of this third device—i.e., the "pot"—imposes an artificial constancy on the volume of the enclosure. This arrangement obviates the fundamental objectives of modularity in basket construction.

In this third device, the cover is relatively shallow, and therefore can be stood on edge when not in use, for conservation of countertop space. Unfortunately, however, the cover is generally oval in plan. Unless placed securely on one of its longer edges, it may be susceptible to rolling away from the position where it is left.

From the foregoing discussion of three different commercial offerings in the second generation of home cookers, the reader will understand that prior artisans in this field have done little more than experiment willy-nilly with various modes of construction. Although various favorable features have appeared in one or another of these devices, these efforts have not been enlightened by any overall appreciation of the benefits or burdens of different structures; or in particular of interactions between the various features.

Accordingly the prior art in this area has failed to advance beyond a group of second-generation devices, all clearly improved over first-generation units but all also respectively flawed by very severe practical handicaps. The prior art has thus failed to provide a truly satisfactory overall configuration that is optimally compact, space and energy efficient, easy to clean, safe, and versatile.

Furthermore this has been the state of affairs in the field of home steamers for at least several years. The householder's need for such a unit has accordingly been long felt, but unmet.

SUMMARY OF THE DISCLOSURE

The present invention provides an apparatus for steam-cooking food. It is clearly of a third generation, substantially more sophisticated and advanced than those discussed earlier.

This invention, in a first one of its preferred forms, includes some means for receiving a quantity of water and applying heat to convert the water to steam. For purposes of breadth and generality of expression in describing the invention, these means will be called the "receiving-and-applying means".

The first preferred form of the invention also includes a unitary molded plastic basket that is closely but removably fitted to the receiving-and-applying means. The baskets has a perforated floor for supporting food, and for passing steam upward into the basket and returning condensed steam as water to the receiving-and-applying means for reuse. The basket also has four upstanding walls erected substantially along the periphery of the perforated floor, for confining the steam and food in mutual contact.

This form of the invention also has a plastic cover dimensioned to be closely but removably fitted upon the walls of the basket. The cover confines the steam within the basket, and collects some condensed steam for return through the perforated floor for reuse.

By virtue of these enumerated elements of this first form of the invention, water and food-juice deposits are easily cleaned from the floor of the plastic basket. Further, the basket and cover together can retain the steam in contact with the food, without any added exterior enclosure.

The four-wall, self-enclosing or autoenclosing configuration makes the unit very space-efficient. Autoenclosure also confers advantages in manufacturing economy, and in handling or procedural efficiency for the user. Moreover, by return of condensate for reuse the invention recycles heat as well as water.

As can now be appreciated, to effectuate significant advances in a mature or third-generation product of this sort, numerous relatively modest improvements have been judiciously combined to obtain an apparatus that is qualitatively different and better in overall performance than any prior apparatus. This overall qualitative improvement is a forward step of which prior artisans were not capable.

A second preferred form of the invention includes, as does the first, receiving-and-applying means. It also includes two unitary molded plastic baskets.

The first of these baskets is removably fitted to the receiving-and-applying means to receive steam therefrom. The first basket also has a perforated floor for supporting food, and for passing steam upward and returning condensed steam as water to the receiving-and-applying means for reuse. This basket has four upstanding walls erected substantially along the periphery of the floor The second basket is removably fitted to the first basket, to receive steam from the first basket. The second basket has a perforated floor for supporting additional food, and for passing steam upward, and for returning condensed steam as water through the first basket to the receiving-and-applying means for reuse. The second basket also has four upstanding walls erected substantially along the periphery of the second basket floor.

This second form of the invention also has a plastic cover dimensioned to be closely but removably fitted upon the walls of the second basket, to collect some condensed steam for return through the baskets for reuse. Furthermore, the walls of the baskets are dimensioned for mutual fitting of the second basket inverted upon the first basket—to form a single double-height cooking space for large pieces of food. In addition the cover is also dimensioned for fitting upon the floor of the second basket when the second basket is inverted.

Through the combined elements and characteristics just described, this second preferred form of the invention is selectably usable, at the option of a user, for either smaller or larger quantities of food. As to smaller quantities of food, this form of the invention is usable without wasting the time and heat required to fill two baskets with steam. As to larger quantities of food, this form of the invention is usable without duplication of the receiving-and-applying means means and cover.

Furthermore, with this second form of the invention the larger quantities of food just mentioned can be, at the further option of the user, either in the form of shallow or tall pieces of food. Shallow pieces of food cannot be quickly and effectively cooked if all stacked together in a double-height cooking space; but tall pieces cannot fit within the height of a single basket.

It will be understood that by virtue of the constructional features described a user can stack not only two but several baskets. Regardless of the exact number used, the full advantages of modularity are preserved—that is, the energy and time used are adjustable to the amount of food to be cooked.

As in the first form of the invention discussed earlier, the four-wall configuration provides space efficiency; and the return of condensate for reuse yields energy efficiency through heat recycling as well as user convenience in water recycling.

Yet a third form of the apparatus of the present invention will now be described. This form includes a base for supporting the apparatus, and also includes heater electrical connections, an electrical indicator, and indicator electrical connections, all disposed within the base.

This form of the invention further includes a plastic water tray for receiving water. The tray is supported on the base, and has a lip extended over the periphery of the base to deter leakage of water from the tray to the heater and indicator electrical connections.

The tray also has a generally central orifice for mounting of a heater, and a web portion extending between the lip and the orifice. A heater is mounted in the water-tray orifice with a water-tight seal, and functionally interconnected with the heater electrical connections, for heating water in the tray to produce steam.

This third form of the invention also includes at least one generally rectangular unitary plastic basket, with a perforated floor, for supporting the food in contact with steam; and a cover closely fitted with the basket. The basket and cover together form a steam-confining enclosure over the water tray.

The steam-confining character of the basket-and-tray combination obviates the need for a separate external enclosure. Manufacturing economy, countertop space efficiency, and procedural efficiency in use are all results of this autoenclosing characteristic.

The heater-to-lip heat-conduction path formed by the web portion of the tray is very long, to minimize heating of the lip while effectively heating water adjacent to the heater. Deposits from the water and food juices are easily cleaned from the water tray as well as the plastic basket.

The foregoing three descriptions may respectively be descriptions of the present invention in its most general and broad forms. As will be understood, however, the invention is perferably used with further refinements or features that advantageously enhance and optimize the benefits and enjoyment of the invention.

For example, it is preferred to use the features of the three preferred forms of the invention in combination. Devices can be configured to employ combinations of the features of the three preferred form taken any two at a time, or in combinations of the features of all three preferred forms together.

Furthermore it is preferred that when two baskets are used they be substantially interchangeable, and indeed substantially identical. This property provides additional benefits of convenience and economy.

With respect to the third form of the invention, an upstanding-tower type of heater is preferred over the crucible heater seen in other units. This selection makes the entire apparatus more economical and thereby extends its benefits to a wider population of prospective users.

It is also preferred to use a heater that includes a sealed heating rod die-cast within a solid metal mass, and mounting arrangements that provide a good permanent seal but easy removal for replacement in case the heater design life is exceeded. These arrangements will be detailed shortly.

It is further preferred that the web portion of the tray be formed to define a generally central recess immediately surrounding the heater, for holding a depth of water around the heater that is greater than the depth of water in the tray generally. In this way heat transfer from the heater to the water is enhanced while the effective heat capacity of the plastic tray is minimized, and steam-cooking of the food begins and proceeds rapidly.

Unlike the containers used in first-generation steamers as noted above, the upper components (baskets and cover) of the present invention are amenable to manufacture from entirely transparent materials. Accordingly, users preferring the functional advantages of transparent construction can enjoy them. As will be appreciated, opaque or translucent units may be preferred by some users for aesthetic reasons, and these too can be provided.

Also unlike the containers of first-generation and second-generation steamers, the cover of the present invention can be made very shallow; and as will be appreciated it is generally square in plan. Hence when not in use it can be stood on edge—and in that condition it occupies negligible countertop space and cannot roll away.

In summary, the present invention is refined ingeniously in a coordinated and coherent way. The benefits of prior units, and other benefits not previously known, are all obtained at once in a single device.

Prior artisans could not see how to refine the steam-cooker art in this way. As often happens with second-generation advancement in a field, they could only move forward willy-nilly in one area or another. Lacking perspective of the entire problem, they could only gain an advance in one feature at the expense of neglecting others.

When all these advantages and others are thus ingeniously combined by the present inventors, the result is not just a little better—that is, not merely improved in a quantitative sense—but becomes a qualitatively different and better device.

The foregoing operational principles and advantages of the present invention will be more fully appreciated upon consideration of the following detailed description, with reference to the appended drawings, of which:

DETAILED DESCRIPTION OF THE PREFERRED EMBODIMENTS

As shown in FIGS. 1 through 9, preferred embodiments of the invention include a plastic base 10, plastic water tray 30, unitary plastic basket 50, and plastic cover 90. In addition, at least two of the three preferred embodiments as described earlier include a second unitary plastic basket 70 that is optionally used—and of which, in fact, there may be more than one.

Carried in the base are a power switch 11, optional indicator (not shown), and electrical connections 12, 14. An aperture 13 is formed at one side of the base for access by a conventional power-cord plug 29 to a two-pin electrical power connector 14, and within that formed aperture a lower notch 15 holds an insulating plate 16 that carries the two-pin connector 14.

Formed in the base 10 are downward-extending support feet 18 and upward-extending pillars 19. The pillars are hollow to accommodate water-tray securing screws 21. Formed in the underside of the water tray 30 are downward-extending attachment bosses 34B which rest on the pillars 19. Each mounting screw 21 passes through a narrow-diameter aperture in the top wall of its pillar 19, and self-threads into a hole in the bottom end of the corresponding attachment boss 34B.

The water tray also rests upon a ledge 22 formed just above the connector aperture 13; and a downward-extending notched boss 23 formed in the underside of the tray captures the top of the previously mentioned insulator plate 16. The periphery 31 of the tray 30 is formed into a downward-extending lip 32 that covers the peripheral edge 24 of the base, deterring water leakage into the base.

Mounted in a central orifice 36 of the tray is a die-cast electrical heater 43, which includes an upstanding tower portion 44, lower body 45, and mounting flange 46; and has electrical connections 12 previously noted. A gasket 41, 42 of "L"-shaped cross-section is disposed radially between the lower body 45 of the heater and the edge of the tray orifice 36, and extends radially outward at 42 below the tray floor 35.

This lower, outward-extending portion 42 of the gasket is captured between the underside of the tray floor 35 and the top of the heater mounting flange 42, and is compressed, to form a watertight seal, by action of a mounting bracket 26. This bracket 26 in turn is secured to the tray 30 by three circumferentially disposed mounting screws 27 (only one being shown). Each of these screws 27 self-threads into a hole (not illustrated) in a corresponding boss 48 formed in the underside of the tray, at a short radial distance outward from the orifice 36.

Figure 1:
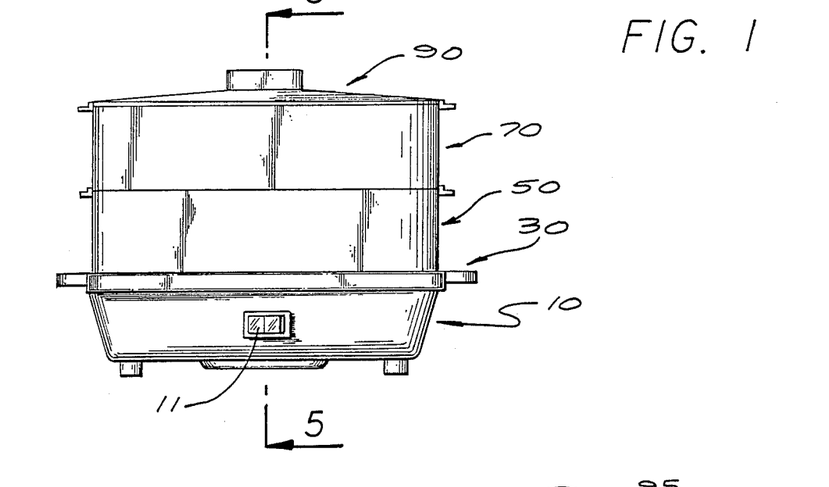
FIG. 1 is an elevation of an apparatus that exemplifies the three embodiments of the invention summarized above. It shows both baskets right-side-up.
Figure 2:
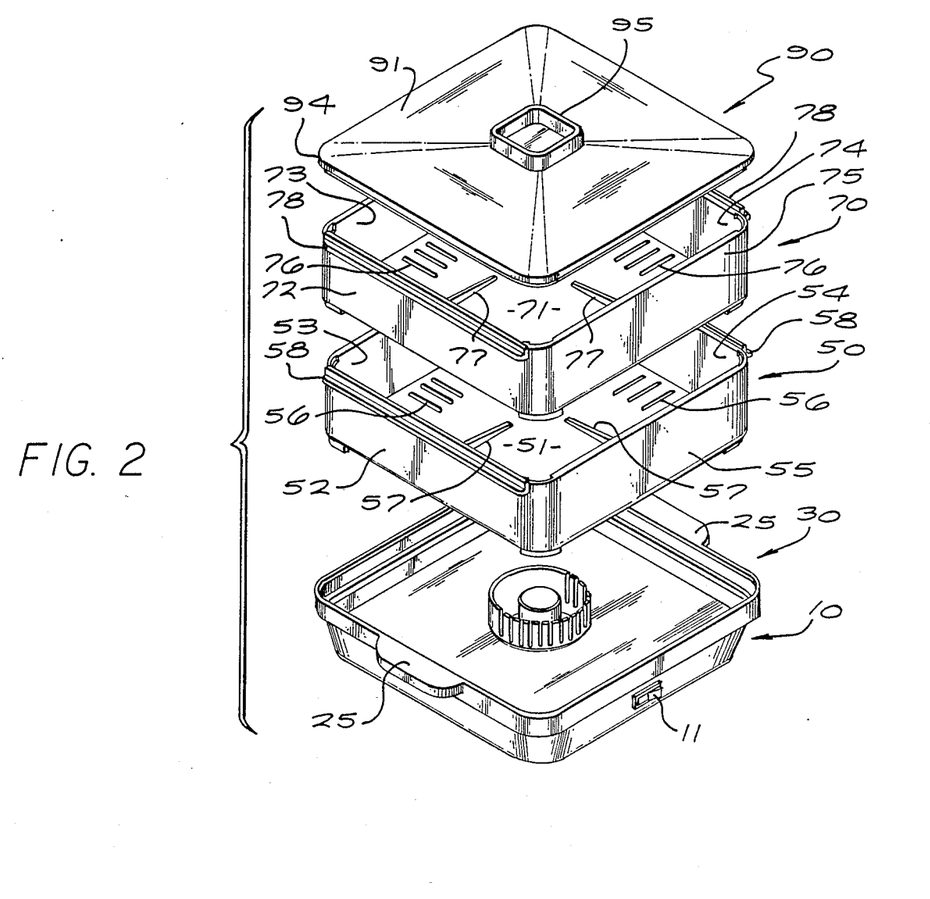
FIG. 2 is an exploded perspective view of the FIG. 1 apparatus.
Figure 5:
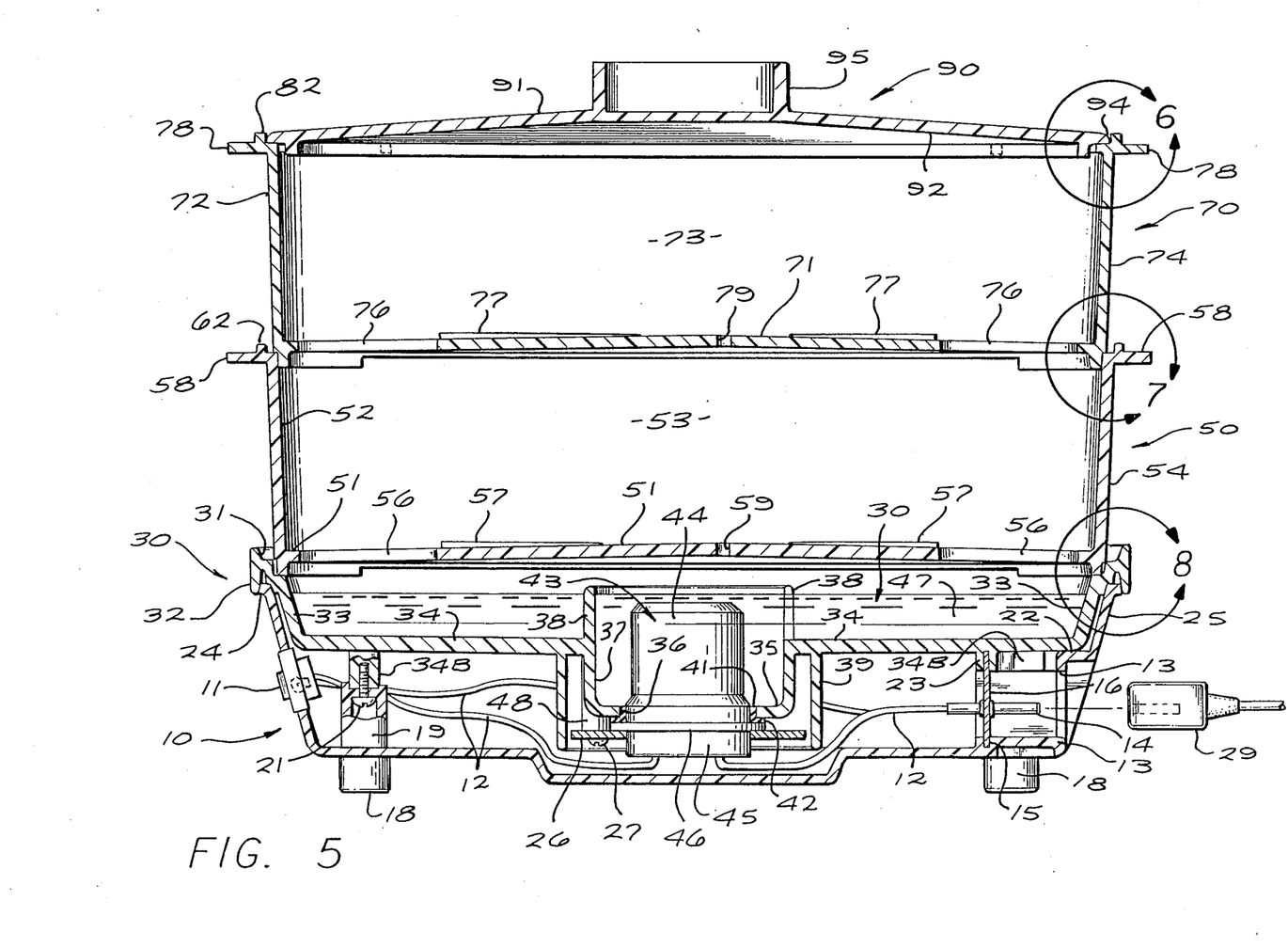
FIG. 5 is a cross-sectional elevation of the same apparatus, taken along the line 5—5 of FIG. 1, and still with both baskets right-side-up.

If a relatively low-wattage heater 43 is employed, the tray 30 is advantageously formed in such a way as to tend to retain a relatively small volume of water in intimate contact with the heater so that vaporization and thereby cooking can begin very promptly. FIGS. 2 and 5 show such a configuration, adapted to enhance rapidity of cooking startup: a small-diameter well 35, 37, 38 is formed around the heater mounting aperture 36, and the peripheral wall 37 of the well 35, 37, 38 is continued upward in a slotted wall 38 that thus extends upward into the water volume 47.

As will be appreciated, water circulation from the interior to the exterior of the heater well 35, 37, 38 is retarded by the solid portions of the wall 38, so that partially heated water tends to remain in the well for further heating and eventual vaporization. A downward-extending circumferential guard 39 may also be formed in the underside of the water tray, just outside the heater well 35, 37, 38 and heater bracket 26, to help retain and conserve the heat in the well.

Figure 10:
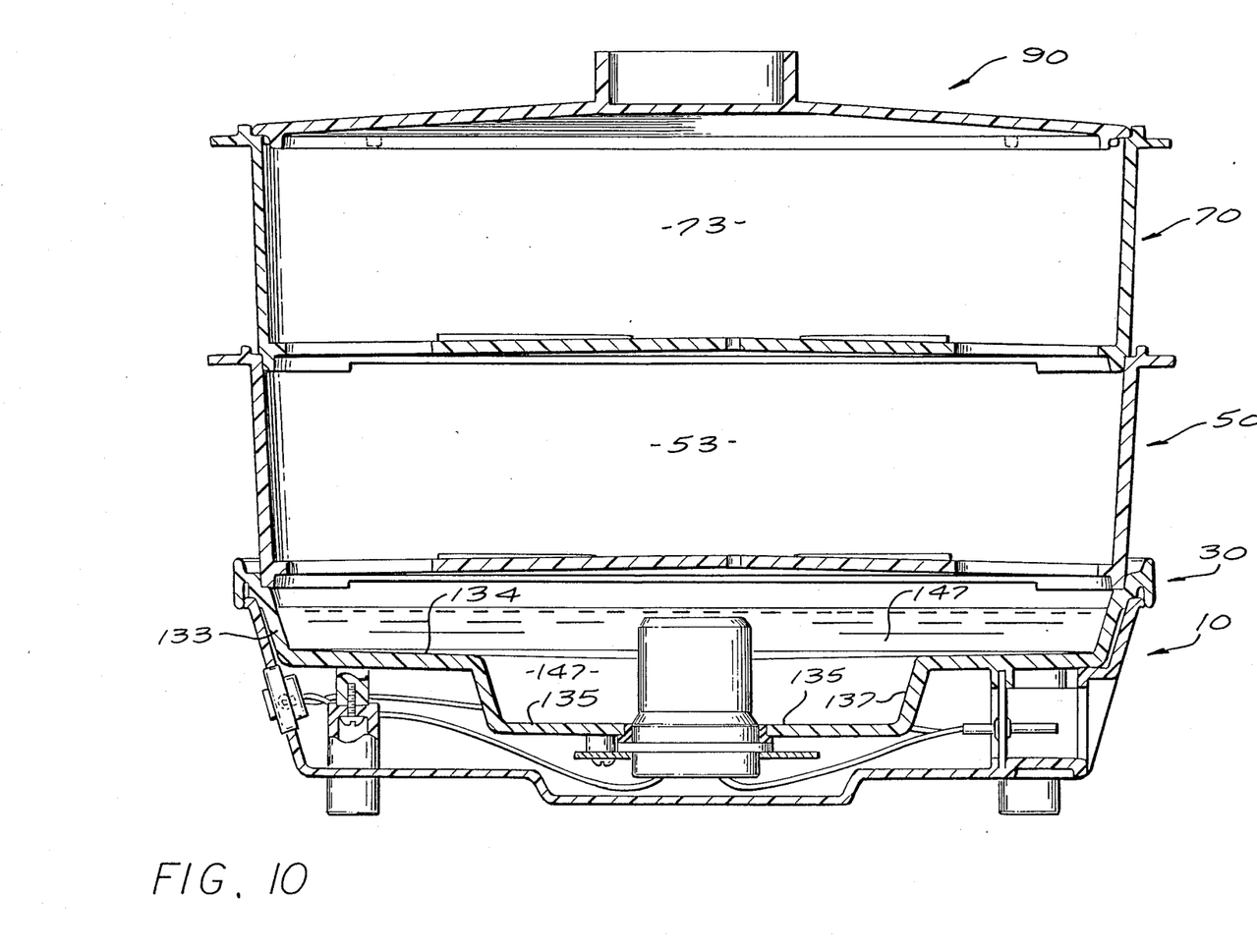
FIG. 10 is a cross-sectional elevation, similar to FIG. 5, of a variant form of the apparatus.

If instead a relatively higher-wattage heater is used, then preferably as shown in FIG. 10 a broader well 135, 137 is provided, with inclined wall 137 but no upward-extending slotted wall. With the greater available power, rapidity of startup is not a major concern. Accordingly this configuration, in combination with the more powerful heater, vaporizes water in an area of larger diameter and in greater quantity—for more-rapid continuous cooking after startup.

In either the FIG. 5 or FIG. 10 configuration, the water tray has an extended web portion 34 (FIG. 5), 134 (FIG. 10) that forms a very long heat-conduction path through the plastic (a material of relatively low heat conductivity), and thus effectively isolates the tray edge 31 thermally from the heater. In view of this isolation, the tray edge need not be peripherally guarded, and can be extended downward in the lip 32 to deter leakage into the lip as previously mentioned. This structure, however, is outside the condensate return path; consequently water (and heat carried by the water) are recycled into the water volume in the water tray.

The two baskets 50 and 70 are advantageously identical or at least interchangeable. Each consists of four upward-extending walls 52–55, 72–75 (FIG. 2) erected upon a perforated floor 51, 71. As will be understood from this description, use of a greater number of walls is not foreclosed; but a smaller number of walls is generally less desirable.

For example, a round or oval floor plan with a single strongly curved wall is substantially less desirable, since less food can be cooked in a round or oval container for a given rectangular allocation of counterspace. The same may be said of a triangular floor plan with three walls.

As a practical matter an appliance of this sort usually shares rectangular counterspace with other implements and food containers that are most efficiently rectangular; and that in turn forms a basis for the stated preference for four walls 52–55, 72–75 as explained above. This does not mean, however, that the basket floor plan must be absolutely and simply rectangular.

Rather, a slight curvature along each wall may be tolerated without significant loss of space efficiency; and the basket corners may be rounded as shown in the drawings, or may be cut off as by, e.g., four additional very short walls at forty-five degrees in the corners, or may be considerably more squared-off or sharp—all as preferred for aesthetic design purposes.

Similarly the perforation pattern shown in the floor of each basket is merely exemplary, a great variety of patterns being substantially equally effective—as long as adequate air and water-vapor circulation is provided. Details of the basket and water-tray handles 58, 78 and 25 (FIG. 2) are also highly variable for aesthetic reasons; but, as will be explained below, the basket handles 58, 78 preferably are configured to stabilize the stack when the upper basket is inverted.

Downward extending tabs 96 (FIG. 4) are formed in the bottom corners of each basket; and, if appropriate as explained below, complementary recesses 85 may be formed in top corners of the baskets (and the water tray) to receive these tabs. Such an interlocking structure helps to stabilize the stacked baskets to each other and to the tray, particularly if the basket walls are relatively thick and substantially vertical.

That geometry would be particularly applicable for baskets made of glass or ceramic materials. For plastic, however—which is preferred for lower weight, cost, and durability—the basket walls are thin and have a so-called "draft" or slight inclination from the vertical as best suggested in FIGS. 5, 9 and 10.

Figure 4:
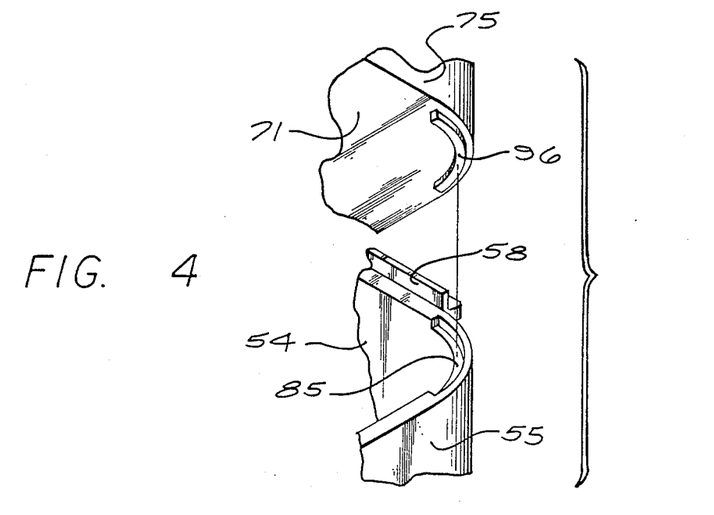
FIG. 4 is a fragmentary detail perspective view showing the interfitting of the baskets in one variant of the same apparatus.

For baskets with inclined thin walls, the recesses 85 of FIG. 4 are undesirable, as the recesses may allow steam to escape at the corners. Instead the tabs 96, and ridges 93 (FIGS. 6 through 8) formed in the underside of the cover 90 as well, simply fit into the basket top openings, or onto a complementary circumferential ledge 33L of the water tray.

It is preferred to configure the baskets so that either may be stacked inverted upon the other to provide a double-height dome enclosure, topped by the cover, when a user desires to steam relatively tall pieces of food. This alternative use is shown in FIGS. 3 and 9.

Figure 6:
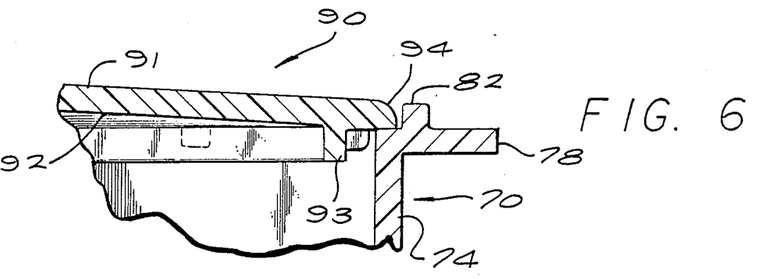
FIG. 6 is a greatly enlarged sectional view of the portion of FIG. 5 enclosed by the circle 6 in FIG. 5, and particularly showing in detail the interfitting of the upper basket and cover.
Figure 7:
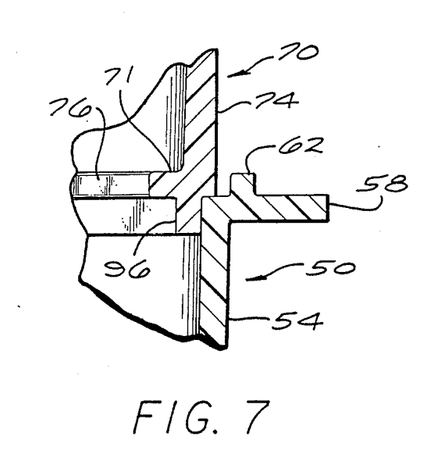
FIG. 7 is a like view of the portion of FIG. 5 enclosed by the circle 7 in FIG. 5, and particularly showing the interfitting of the two baskets—still with both baskets right-side-up.
Figure 8:
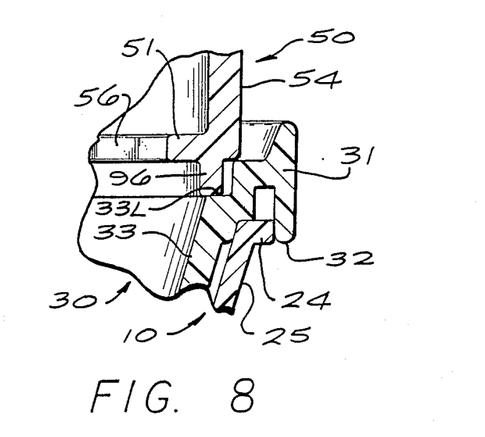
FIG. 8 is a like view of the portion of FIG. 5 enclosed by the circle 8 in FIG. 5, and particularly showing the interfitting of the water tray with both the lower basket and the base.

To facilitate this use, it is preferred to form upward- and outward-extending handles 58, 78 along two edges of each basket. As can be seen in FIGS. 5 through 7, when both baskets are right-side-up these handles do not participate in the interlocking of the baskets.

Figure 3:
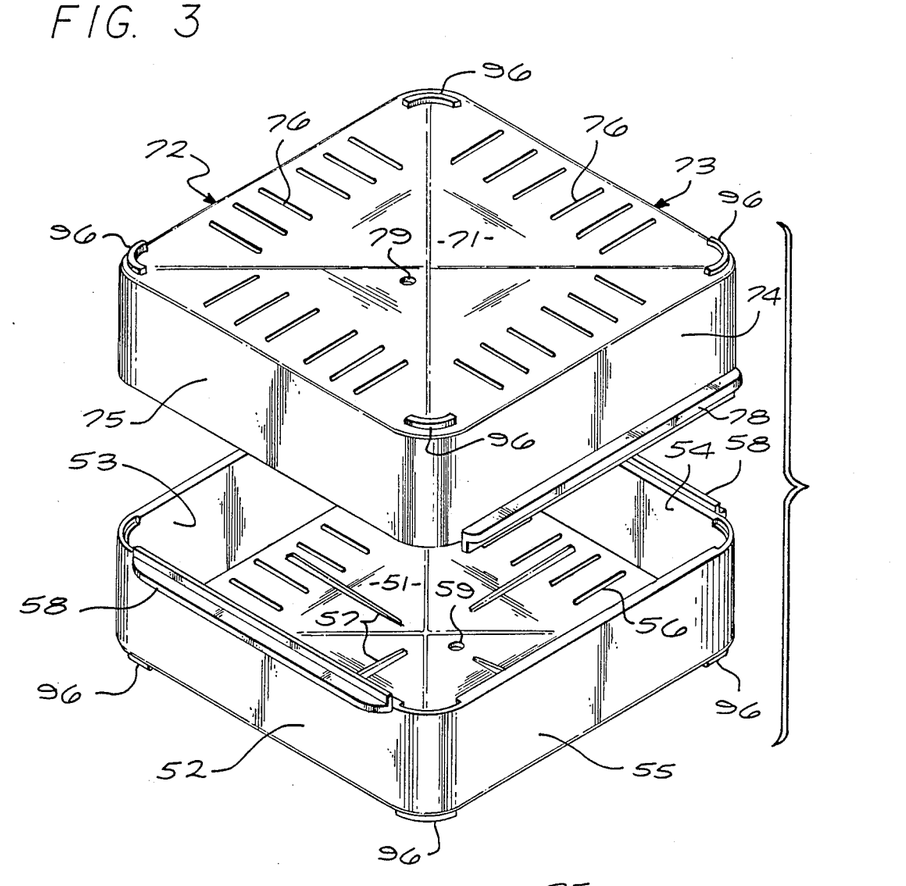
FIG. 3 is a partial exploded view of the same apparatus, in particular including only the two baskets, and showing the upper basket inverted.
Figure 9:
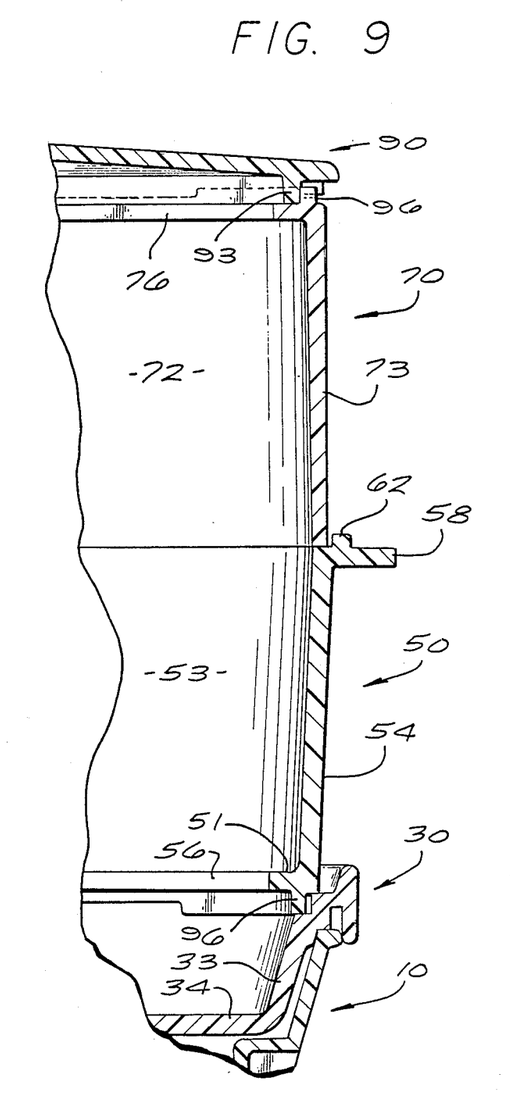
FIG. 9 is a partial cross-sectional elevation, analogous to the right end of FIG. 5, but showing the upper basket inverted.

When the upper basket is inverted, however, and the baskets are mutually rotated about a vertical axis so that the handles 58, 78 of each basket extend along the handle-free sides (73, 75, and 53, 55 respectively) of the other basket as in FIGS. 3 and 9, each pair of handles stabilizes the stack in one of two orthogonal directions.

In other words, one pair of handles 58 keeps the upper basket 70 from sliding off the lower basket 50 in a first direction. The other pair of handles 78 keeps the upper basket 70 from sliding off the lower basket 50 in a second direction that is perpendicular to the first.

In these ways the baskets are made to interfit stably with each other (and with the water tray) whether the upper basket is right-side-up or upside-down. Analogously the cover 90 is provided with downward-extending peripheral ridges 93 and relatively wide outward-extending circumferential flanges or lips 94 (FIG. 6), for good interfitting with either the top or bottom of the upper basket—or with the top of a single basket when only one basket is in use.

Three or four baskets, or even more, can be stacked together in various combinations of shelf-wise or double-height dome-wise configurations. For example, two dome chambers can be formed, or one dome chamber with a shelf above and another shelf below; and so forth. A handle 95 is formed in the top of the cover 90.

As seen in FIGS. 5 and 10, the undersurface 92 of the cover 90 is best formed with a slight inclination from the horizontal. This inclination facilitates condensate flow from the cover undersurface 92 to its peripheral downward-extending ridges 93, for return via the basket-floor perforations 76 to the water tray.

For like reasons the basket floors 51, 71 advantageously are bowed slightly, as best seen in FIGS. 5 and 10. This inclination facilitates return flow of condensate along the upper surfaces as well as the undersurfaces of the basket floors 51, 71.

When a basket is upside-down, however, the bowed form causes condensate returned from the cover to collect at the center of the basket floor. In addition, even for a right-side-up basket some condensate may tend to stall near the center, particularly when food arranged on the basket dams the water near the center.

To minimize both these effects and thereby further facilitate return flow, small holes 59, 79 are provided near the basket centers. The basket floors also are preferably ribbed as at 57, 77—for level, stable support of a dish or the like placed in either basket, and also for additional strength in supporting food.

It will be understood that the foregoing disclosure is intended to be merely exemplary, and not to limit the scope of the invention—which is to be determined by reference to the appended claims.

What is claimed is:

1. Apparatus for steam-cooking food, comprising:
   means for receiving a quantity of water and applying heat to convert the water to steam;
   at least one unitary molded plastic basket closely but removably fitted to the receiving-and-applying means to capture the steam, and having:

a perforated floor for supporting such food, and for passing the steam upward into the basket and returning condensed steam as water to the receiving-and-applying means for reuse, said floor having a periphery, and four upstanding walls, erected substantially along the periphery, for confining the steam and such food in mutual contact; and a plastic cover dimensioned to be closely but removably fitted upon the walls of the basket to confine the steam within the basket and to collect some condensed steam for return through the floor for reuse;

whereby water and food-juice deposits are easily cleaned from the floor of the plastic basket; and whereby the basket and cover together can retain the steam in contact with such food without any added exterior enclosure;

a second unitary plastic basket interposed between the first-mentioned basket and the cover, and closely but removably fitted to the first-mentioned basket to capture steam rising therefrom, for supporting and confining additional such food and steam in mutual contact, said second basket having:

a perforated floor for supporting such food, and for passing the steam upward into the basket and returning condensed steam as water through the first-mentioned basket to the receiving-and-applying means for reuse, said floor of the second basket having a periphery, and four upstanding walls erected substantially along the periphery of the second basket floor for confining such additional food and steam in mutual contact; said second-basket walls being dimensioned to be closely but removably interfitted, in place of the first-mentioned-basket walls, with the cover; and whereby the apparatus is selectably usable, at the option of a user, either for larger quantities of food without duplication of the receiving-and-applying means and cover, or for smaller quantities of food without wasting time and heat required to fill two baskets with steam;

wherein the walls of the baskets are dimensioned for close mutual fitting of the second basket inverted upon the first-mentioned basket to form therewith a single double-height enclosure for large pieces of such food; and wherein the cover is dimensioned for close fitting upon the floor of the second basket when inverted, to confine the steam within the double-height enclosure;

whereby the apparatus is further selectably usable for such larger quantities of food, at the option of a user, either in the form of shallow pieces of such food which could not be as quickly and effectively cooked if all stacked together in a double-height enclosure, or tall pieces of such food which could not fit within the height of a single basket.

2. The apparatus of claim 1, wherein:
the two plastic baskets are substantially mutually identical.

3. The apparatus of claim 1, wherein:
the two plastic baskets are substantially interchangeable.

4. Apparatus for steam-cooking food, comprising:
means for receiving a quantity of water and applying heat to convert the water to steam;

a unitary molded plastic basket removably fitted to the receiving-and-applying means to receive steam therefrom, and having:

a perforated floor for supporting such food, and for passing steam upward into the basket and returning condensed steam as water to the receiving-and-applying means for reuse, said floor having a periphery, and four upstanding walls erected substantially along the periphery;

a second unitary plastic basket removably fitted to the first-mentioned basket to receive steam therefrom, and having:

a perforated floor for supporting additional such food, and for passing steam upward, and for returning condensed steam as water through the first-mentioned basket to the receiving-and-applying means for reuse, said floor of the second basket having a periphery, and four upstanding walls erected substantially along the periphery of the second basket floor;

a plastic cover dimensioned to be closely but removably fitted upon the walls of the second basket to collect some condensed steam for return through the baskets for reuse;

the walls of the baskets being dimensioned for mutual fitting of the second basket inverted upon the first-mentioned basket to form therewith a single double-height cooking space for large pieces of such food; and the cover being dimensioned for fitting upon the floor of the second basket when inverted;

whereby the apparatus is selectably usable, at the option of a user, either for smaller quantities of food without wasting the time and heat required to fill two baskets with steam, or for larger quantities of food without duplication of the receiving-and-applying means and cover; and such larger quantities of food, at the further option of a user, being either in the form of shallow pieces of such food which could not be as quickly and effectively cooked if all stacked together in a double-height cooking space, or tall pieces of such food which could not fit within the height of a single basket.

5. The apparatus of claim 4, wherein:
the two plastic baskets are closely fitted with each other, and with the receiving-and-supplying means and the cover, to confine the steam and such food in mutual contact;

whereby no additional exterior enclosure is required for confining the steam.

6. The apparatus of claim 5, wherein:
the two plastic baskets are substantially interchangeable.

7. The apparatus of claim 6, wherein the receiving-and-supplying means comprise:
a base for supporting the apparatus, said base having a periphery;

heater electrical connections, an electrical indicator, and indicator electrical connections, disposed within the base;

a plastic water tray having a lip extended over the periphery of the base; and a heater centrally mounted in the water tray.

8. The apparatus of claim 4, wherein the receiving-and-applying means comprise:
a base for supporting the apparatus, said base having a periphery;

heater electrical connections, an electrical indicator, and indicator electrical connections, disposed within the base;

a plastic water tray having a lip extended over the periphery of the base; and a heater centrally mounted in the water tray.

9. Apparatus for steam-cooking food, comprising:

means for receiving a quantity of water and applying heat to convert the water to steam;

at least two unitary molded plastic baskets, each having:

a perforated floor for supporting such food, and for passing the steam upward into the respective basket and returning condensed steam downward as water for reuse, said floor having a periphery, and four upstanding walls, erected substantially along the periphery, for confining the steam and such food in mutual contact; and a plastic cover;

a first of the baskets being closely but removably fitted to the receiving-and-applying means, to capture the steam rising therefrom and return the condensed steam thereto;

a second of the baskets being interposed between the first basket and the cover, and closely but removably fitted to the first basket, to capture steam rising therefrom and to return the condensed steam therethrough to the receiving-and-applying means for reuse;

wherein the walls of the baskets are dimensioned for close mutual fitting of the second basket upon the first basket, with said second basket being selectably either: (a) inverted to form with the first basket a single double-height enclosure for large pieces of such food, or (b) right-side-up; and wherein the cover is dimensioned to be closely but removably fitted upon the walls of either of the first and second baskets to confine the steam within that basket and to collect some condensed steam for return through the baskets for reuse; and also dimensioned for close fitting upon the floor of the second basket when inverted, to confine the steam within the double-height enclosure;

whereby the apparatus is selectably usable for such larger quantities of food, at the option of a user, either in the form of shallow pieces of such food which could not be as quickly and effectively cooked if all stacked together in a double-height enclosure, or tall pieces of such food which could not fit within the height of a single basket.

10. The apparatus of claim 9, wherein:

the two baskets are substantially mutually identical.

11. The apparatus of claim 9, wherein:

the two baskets are substantially interchangeable.

* * * * *